United States Patent
Satish et al.

(10) Patent No.: US 8,365,283 B1
(45) Date of Patent: Jan. 29, 2013

(54) DETECTING MUTATING MALWARE USING FINGERPRINTS

(75) Inventors: Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 831 days.

(21) Appl. No.: 12/198,046

(22) Filed: Aug. 25, 2008

(51) Int. Cl.
*G06F 11/00* (2006.01)
*H04L 29/06* (2006.01)

(52) U.S. Cl. .......................................... 726/23; 713/152
(58) Field of Classification Search .................... 726/23; 713/152
See application file for complete search history.

(56) References Cited

U.S. PATENT DOCUMENTS

| | | | |
|---|---|---|---|
| 5,826,013 A * | 10/1998 | Nachenberg | 726/22 |
| 6,971,019 B1 * | 11/2005 | Nachenberg | 713/188 |
| 7,284,273 B1 * | 10/2007 | Szor | 726/24 |
| 7,624,449 B1 * | 11/2009 | Perriot | 726/24 |
| 7,757,284 B1 * | 7/2010 | Viljoen | 726/22 |
| 2004/0064737 A1 * | 4/2004 | Milliken et al. | 713/201 |
| 2004/0255165 A1 * | 12/2004 | Szor | 713/201 |
| 2005/0005153 A1 * | 1/2005 | Das et al. | 713/200 |
| 2005/0132184 A1 * | 6/2005 | Palliyil et al. | 713/152 |
| 2006/0064755 A1 * | 3/2006 | Azadet et al. | 726/24 |
| 2007/0094734 A1 * | 4/2007 | Mangione-Smith et al. | 726/24 |
| 2007/0143848 A1 * | 6/2007 | Kraemer et al. | 726/23 |
| 2008/0022405 A1 * | 1/2008 | Wang et al. | 726/23 |
| 2008/0222729 A1 * | 9/2008 | Chen et al. | 726/24 |
| 2009/0083854 A1 * | 3/2009 | Bozanich et al. | 726/23 |
| 2009/0313700 A1 * | 12/2009 | Horne | 726/24 |

* cited by examiner

*Primary Examiner* — Techane Gergiso
(74) *Attorney, Agent, or Firm* — Fenwick & West LLP (57) ABSTRACT

A plurality of fingerprints are created for a file. Each fingerprint is created in response to an instance of activity involving the file. A malware signature associated with the mutating malware is compared to one or more of the plurality of fingerprints. In response to the malware signature matching one of the plurality of fingerprints, determining that the file is infected with mutating malware. Further, in response to determining that the file is infected with mutating malware, transmitting to a server multiple fingerprints of the plurality of fingerprints. The server analyzes the multiple fingerprints to determine a pattern of mutation by the mutating malware. The determined pattern of mutation is used by the server to create a signature for detecting mutations of the mutating malware.

13 Claims, 6 Drawing Sheets

DETECTING MUTATING MALWARE USING FINGERPRINTS

BACKGROUND OF THE INVENTION

1. Field of the Invention

This invention pertains in general to computer security and in particular to detecting mutating malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Classical malware can typically be detected by conventional security software using techniques such as signature scanning and behavior monitoring heuristics. However, to evade security software attackers have developed mutating malware, which is malware that frequently modifies itself. Since the malware is frequently mutating, it makes it impossible to have a signature for every malware mutation, thus making it difficult to detect mutating malware using signature scanning. Behavior monitoring heuristics can sometimes detect mutating malware but often produces false positive detections. Accordingly, there is a need in the art for ways to detect mutating malware that does not suffer from these drawbacks.

BRIEF SUMMARY OF THE INVENTION

The above and other needs are met by a method and computer program product that detects mutating malware in a file. Embodiments of the method comprise creating a plurality of fingerprints for the file, each fingerprint created responsive to an instance of activity involving the file. A malware signature associated with the mutating malware is compared to one or more of the plurality of fingerprints. In response to the malware signature matching one of the plurality of fingerprints, it is determined that the file is infected with mutating malware.

Embodiments of the computer program product also comprise a fingerprint module configured to create a plurality of fingerprints for the file, each fingerprint created responsive to an instance of activity involving the file. The computer program product further comprises a malware detection module configured to compare a malware signature associated with the mutating malware to one or more of the plurality of fingerprints and determine that the file is infected with mutating malware responsive to the malware signature matching one of the plurality of fingerprints.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
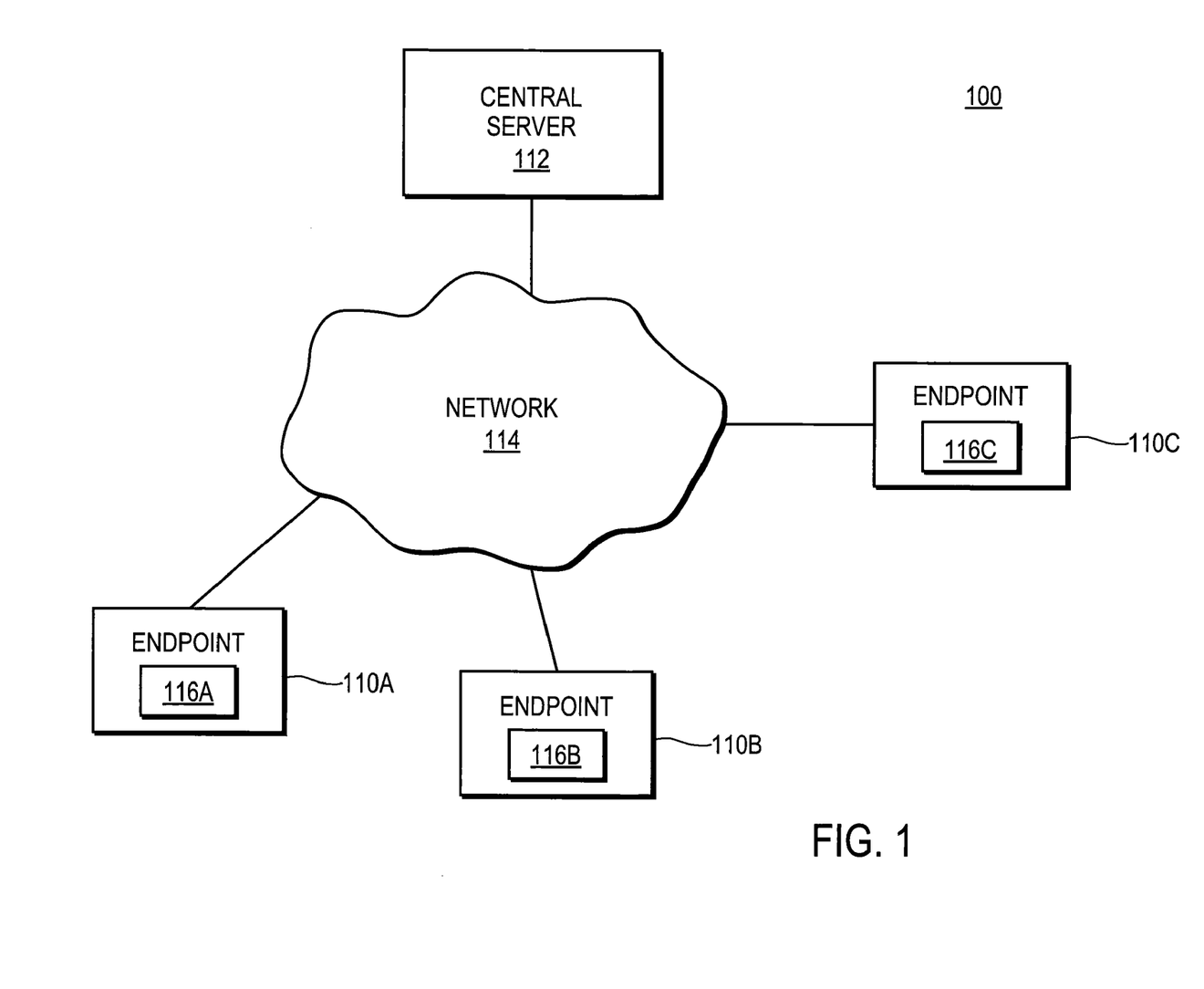
FIG. 1 is a high-level block diagram of a computing environment according to one embodiment.

FIG. 1 is a high-level block diagram of a computing environment 100 according to one embodiment. FIG. 1 illustrates three endpoints 110 and a central server 112 connected by a network 114. Only three endpoints 110 are shown in FIG. 1 in order to simplify and clarify the description. Embodiments of the computing environment 100 can have thousands or millions of endpoints 110 connected to the network 114.

FIG. 1 and the other figures use like reference numerals to identify like elements. A letter after a reference numeral, such as "110A," indicates that the text refers specifically to the element having that particular reference numeral. A reference numeral in the text without a following letter, such as "116," refers to any or all of the elements in the figures bearing that reference numeral (e.g. "116" in the text refers to reference numerals "116A," "116B," and/or "116C" in the figures).

In one embodiment, an endpoint 110 is a computer used by one or more users to perform activities including downloading, installing, and/or executing files and browsing web sites on the network 114. The endpoint 110, for example, can be a personal computer executing a web browser such as MICROSOFT INTERNET EXPLORER that allows the user to retrieve and display content from web servers and other computers on the network 114. In other embodiments, the endpoint 110 is a network-capable device other than a computer, such as a personal digital assistant (PDA), a mobile telephone, a pager, a television "set-top box," etc. For purposes of this description, the term "endpoint" also includes computers such as servers and gateways that encounter files or other entities that might constitute malware or other threats. For example, an endpoint 110 can be a network gateway located between an enterprise network and the Internet. The endpoint 110 can also be a mail server or web server that stores files that can be accessed by other endpoints 110.

In one embodiment, the endpoint 110 executes a security module 116 that detects malware on the endpoint 110. To detect malware on the endpoint 110, the security module 116 monitors file activity at the endpoint 110. If an instance of activity occurs involving a file (e.g., file created or modified), the security module 116 creates and stores a fingerprint for the file. The security module 116 may store multiple fingerprints for each file. A fingerprint is a representation of a file, and is generated in a manner such that the fingerprint uniquely identifies the file.

To scan a file for malware, the security module 116 retrieves fingerprints created for the file and compares the retrieved fingerprints to stored malware signatures. Each signature describes a known type of malware. If a fingerprint matches a signature, it signifies that the file is infected with the malware described by the signature. In response to determining that the file is infected with malware, the security module 116 remediates the file. By using multiple fingerprints associated with the file to scan the file for malware, the malware can be detected by the security module 116 using a signature even if the malware has mutated to a state where it no longer corresponds to the signature, since the signature may still correspond to one of the file's fingerprints. If it is determined that the file is infected with malware, the security module 116 transmits fingerprints of the file to the central server 112 for analysis of the malware and its mutations.

The central server 112 interacts with the endpoints 110 via the network 114. The central server 112 receives from endpoints 110 fingerprints of files infected with malware. The central server 112 analyzes the sets of fingerprints received from endpoints 110 to gain knowledge about the mutations performed by specific types of malware. The knowledge gained by the central server 112 is used to create new signatures that can detect specific types of malware through their various stages of mutation. Signatures created by the central server 112 are transmitted to endpoints 110 coupled to the central server 112 via the network 114.

The network 114 represents the communication pathways between the endpoints 110 and the central server 112. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
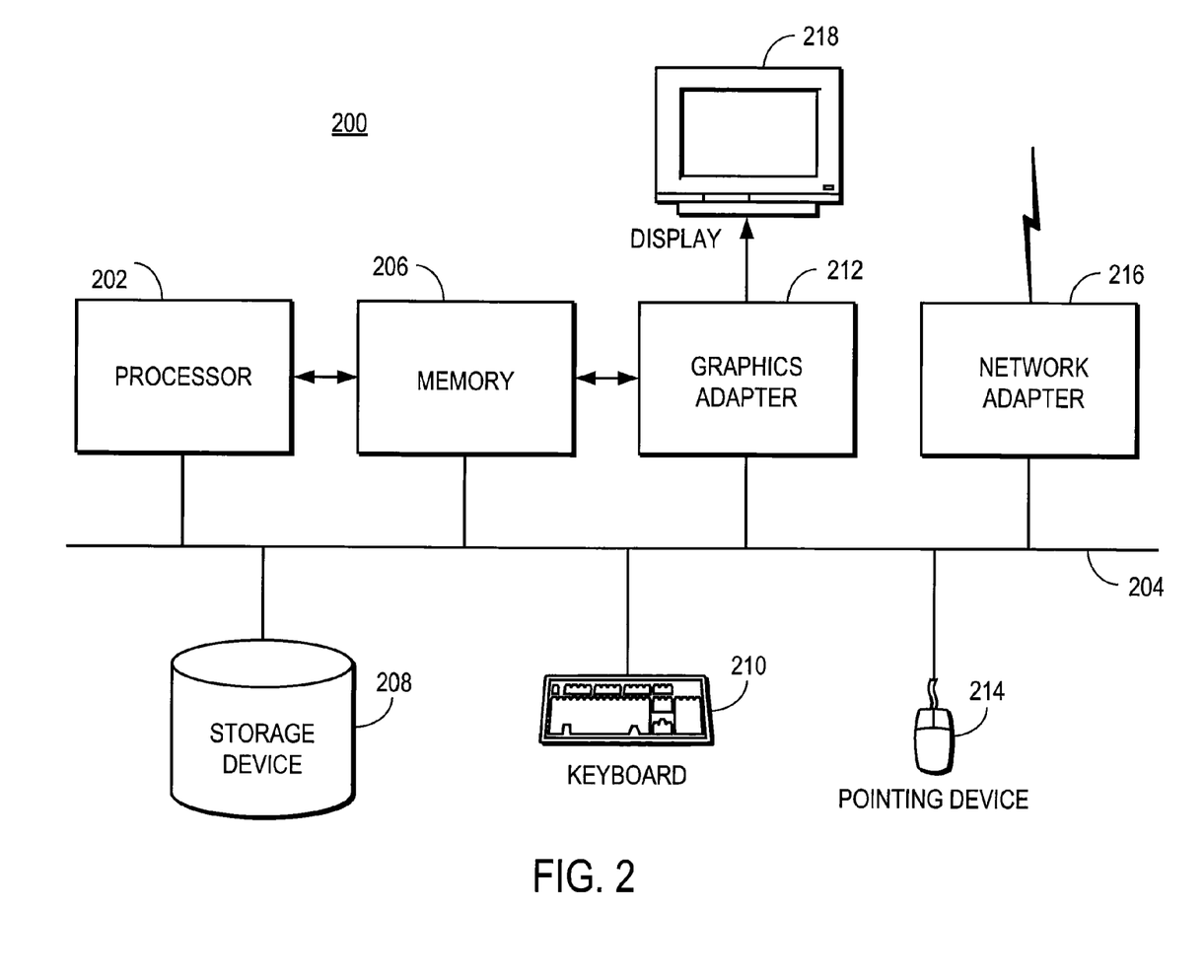
FIG. 2 is a high-level block diagram illustrating a typical computer for use as a central server or endpoint according to one embodiment.

FIG. 2 is a high-level block diagram illustrating a typical computer 200 for use as an endpoint 110 or central server 112 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, an endpoint 110 that is a mobile telephone typically has limited processing power, a small display 218, and might lack a pointing device 214. The central server 112, in contrast, may comprise multiple blade servers working together to provide the functionality described herein.

Figure 3:
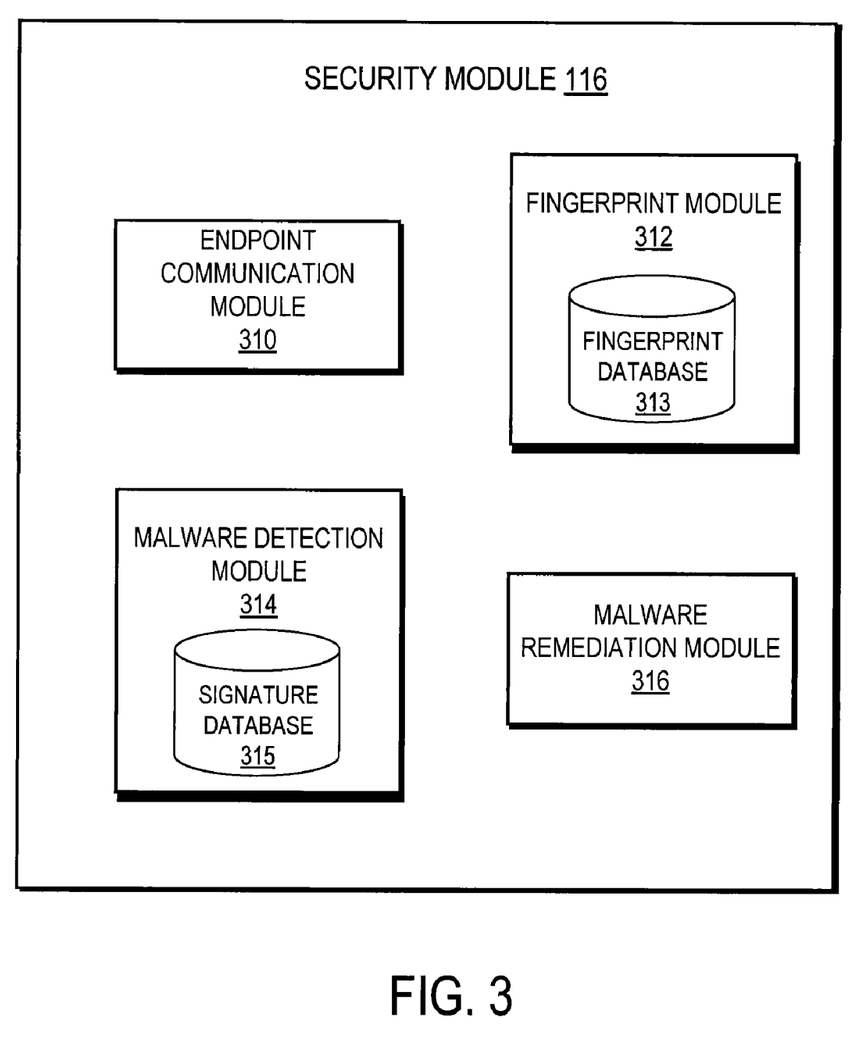
FIG. 3 is a high-level block diagram illustrating a detailed view of the security module of an endpoint according to one embodiment.

FIG. 3 is a high-level block diagram illustrating a detailed view of the security module 116 of an endpoint 110 according to one embodiment. In some embodiments the security module 116 is incorporated into an operating system executing on the endpoint 110 while in other embodiments the security module 116 is a standalone application or part of another product. As shown in FIG. 3, the security module 116 itself includes multiple modules. Those of skill in the art will recognize that other embodiments of the security module 116 can have different and/or other modules than the ones described here, and that the functionalities can be distributed among the modules in a different manner.

An endpoint communication module 310 communicates with the central server 112 via the network 114. In one embodiment, the endpoint communication module 310 sends to the central server 112 fingerprints of files identified as being infected with malware. In addition, an embodiment of the endpoint communication module 310 receives from the central server 112, signatures for detecting malware on the endpoint 110.

A fingerprint module 312 creates and stores fingerprints for files stored on the endpoint 110. The fingerprint module 312 monitors activity occurring in the endpoint 110 to detect an instance of activity involving a file. An instance of activity that may be detected by the fingerprint module 312 includes a new file being created on the endpoint 110 and an existing file being modified. When the fingerprint module 312 detects an instance of activity involving a file, the fingerprint module creates and stores a fingerprint that uniquely identifies the file. The fingerprint module 312 can create a fingerprint of a file using techniques incorporating the MD5 or SHA256 hashing functions, extracting n-grams of string contents from the file, generating call graphs from the file, etc.

In one embodiment, the fingerprint module 312 includes a fingerprint database 313 and stores fingerprints created in the fingerprint database 313. In one embodiment, the fingerprint module 312 creates fingerprints for only files that are of a type that might be infected with malware such as executable files and other types of files that include computer program instructions In one embodiment, the number of fingerprints that the fingerprint module 312 stores for each file depends on the type of the file. For example, for a file that is of a type that is frequently modified (e.g., a word processor file), the maximum number of fingerprints that the fingerprint module 312 stores for the file is higher than the maximum number of fingerprints stored for a file that is not frequently modified. Additionally, the fingerprint module 312 may store more fingerprints for a file that is of a type that has a high probability of being infected with malware. In one embodiment, after a fingerprint for a file has been created and stored, the fingerprint module 312 determines based on the type of the file whether the number of fingerprints created for the file is above a threshold. If the number of fingerprints created is above the threshold, the fingerprint module 312 deletes the oldest fingerprint created for the file.

A malware detection module 314 scans files stored on the endpoint 110 to determine whether the files are infected with malware. In one embodiment, the malware detection module 314 scans files stored on the endpoint 110 periodically (e.g., every 24 hours) and/or after a specific event (e.g., a file access). In one embodiment, the malware detection module 314 includes a signature database 315 that includes multiple signatures. Each signature stored in the signature database 315 describes a known type of malware.

In one embodiment, when the malware detection module 314 scans a file for malware, the malware detection module 314 retrieves from the fingerprint database 313 fingerprints stored by the fingerprint module 312 for the file. The malware detection module 314 compares signatures stored in the signature database 315 to each of the fingerprints for the file. If any of the fingerprints for a file match with a signature, the malware detection module 314 determines that the file is infected with the malware associated with the matching signature. Therefore, by scanning each of the file's fingerprints, malware in the file can be detected even if the malware has mutated to a state where it no longer corresponds with the signature stored for detecting the malware. The stored signature may still match one of the file's fingerprints.

In another embodiment, when the malware detection module 314 scans a file for malware, the malware detection module 314 scans the file in two phases. In the first phase of the scan, the malware detection module 314 retrieves only the most recent fingerprint created for the file. The malware detection module 314 compares signatures stored in the signature database 315 to the retrieved fingerprint. If the fingerprint matches a signature, the malware detection module 314 determines that the file is infected with malware.

If the fingerprint does not match any of the signatures, the malware detection module 314 performs the second phase of the scan. In one embodiment, the second phase of the scan occurs asynchronously with the first phase and can be deferred to a later time. In one embodiment, the second phase of the scan occurs after the most recent fingerprint of each file stored on the endpoint has been compared to the stored signatures. When the malware detection module 314 executes the second phase of the scan, the malware detection module 314 excludes each file's fingerprint scanned in the first phase from being scanned in the second phase.

A malware remediation module 316 remediates files infected with malware. In one embodiment, if the malware detection module 314 determines that a file is infected with malware, the malware remediation module 316 remediates the file by attempting to clean up the file and/or quarantining the file. In one embodiment, the process by which the malware remediation module 316 remediates the file is based on settings set by a user. For example, settings may indicate that the malware remediation module 316 quarantine any file infected with malware.

In one embodiment, the malware remediation module 316 transmits to the central server 112 some or all of the fingerprints of the infected file. In one embodiment, the malware remediation module 316 transmits to the central server 112 only the fingerprint of the file that matched a signature and any subsequent fingerprints created for the file. For example, the fingerprint database 313 may include ten fingerprints for a file, with the first fingerprint being the oldest fingerprint and the tenth fingerprint being the newest fingerprint. If the second fingerprint was the fingerprint that matched a signature, the malware remediation module 316 sends the second fingerprint and all subsequent fingerprints (fingerprints 3-10) to the central server 112. In other embodiments, different fingerprints of the file are sent to the central server 112.

Figure 4:
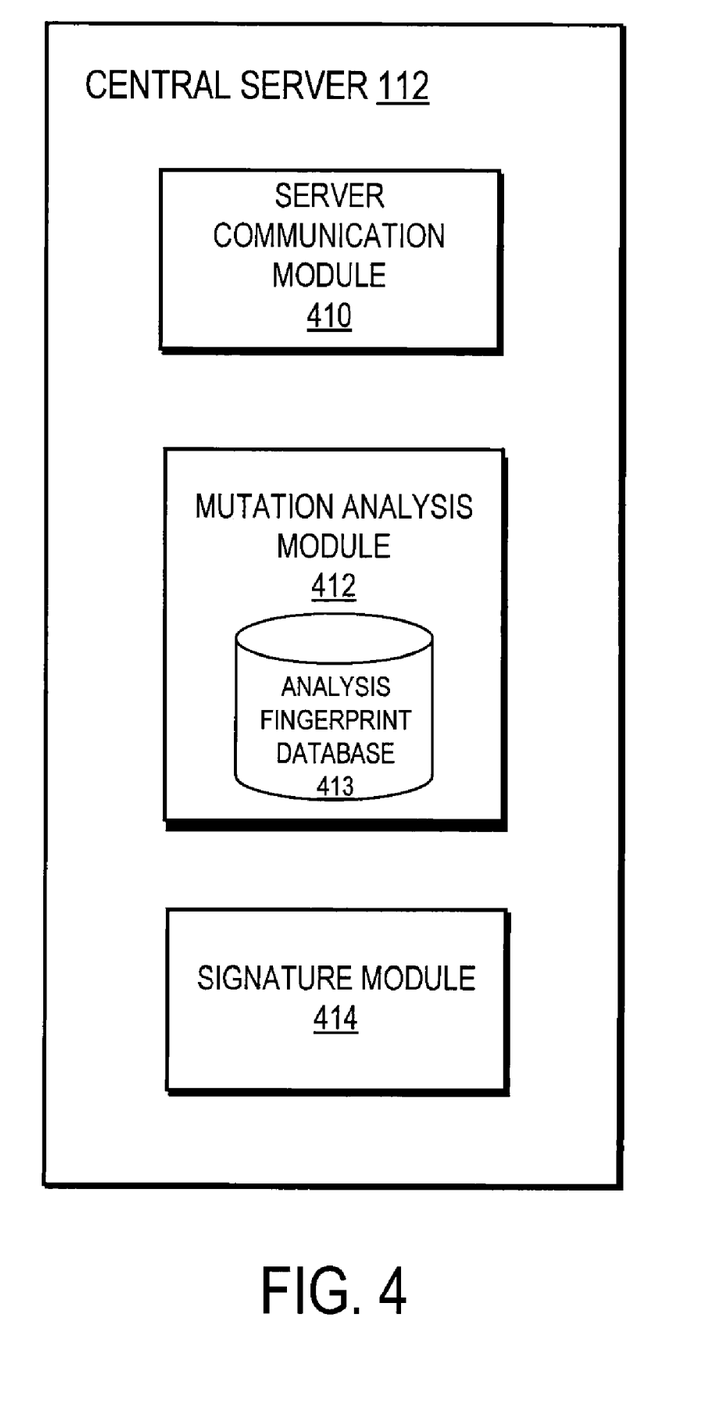
FIG. 4 is a high-level block diagram illustrating a detailed view of the central server according to one embodiment.

FIG. 4 is a high-level block diagram illustrating a detailed view of the central server 112 according to one embodiment. In one embodiment, the central server 112 is operating by the same entity that provides the security modules 116 to the endpoints 110. As shown in FIG. 4, the central server 112 includes several modules. Those of skill in the art will recognize that other embodiments of the central server 112 can have different and/or other modules than the ones described here, and that the functionalities can be distributed among the modules in a different manner. In addition, the functions ascribed to the central server 112 can be performed by multiple servers.

A server communication module 410 communicates with the endpoints 110 via the network 114. In one embodiment, the server communication module 410 receives from the endpoints 110 fingerprints of files determined to be infected with malware. In one embodiment, for a file determined to be infected with malware, the server communication module 410 receives the fingerprint of the file that matched the malware signature and any subsequent fingerprints created for the file. Further, an embodiment of the server communication module 410 provides the endpoints 110 with signatures for detecting malware on the endpoints.

A mutation analysis module 412 stores and analyzes fingerprints received from endpoints 110 to gain knowledge about mutations performed by different types of malware. In one embodiment, the mutation analysis module 412 analyzes fingerprints received from endpoints 110 to determine if malware that infected a file on one or more endpoints 110 has generic mutating code. If the malware has generic mutating code it signifies that the mutations by the malware are not dependent on the endpoint 110 it infects. In other words, the malware mutates in the same manner on all endpoints 110.

In one embodiment, to determine if a particular type of malware has generic mutating code, the mutation analysis module 412 identifies sets of fingerprints received from multiple endpoints 110, each set of fingerprints of a file infected with the same particular type of malware. The mutation analysis module 412 compares the sets of fingerprints to determine whether there is a pattern to the mutations by the specific type of malware. If at least a specific number of sets are similar or the same, the mutation analysis module 412 determines that the malware has generic mutating code. For example, the mutation analysis module 412 may receive three sets of fingerprints, each set of fingerprints received from a different endpoint 110 and of a file infected with the same type of malware. The mutation analysis module 412 compares the three sets of fingerprints. If the three sets of fingerprints are the same, or at least the same in the aspects introduced by the malware, the mutation analysis module 412 determines that the particular type of malware has generic mutating code.

If it is determined that the malware has generic mutating code, the mutation analysis module 412 analyzes at least one of the identified sets of fingerprints to determine the pattern by which the malware mutates. For example, the mutation analysis module 412 may determine that each time the particular type of malware mutates a bit value within the new fingerprint increases by a specific amount relative to the previous fingerprint for the file.

In one embodiment, if the mutation analysis module 412 determines based on the fingerprint comparison that the particular type of malware does not have generic mutating code, or if a general pattern of mutation cannot be determined for the malware, the mutation analysis module 412 stores the sets of fingerprints in an analysis fingerprint database 413 for subsequent use by the mutation analysis module 412 when other fingerprints of files infected with the same type of malware are received. In one embodiment, the mutation analysis module 412 additionally sends copies of the sets of fingerprints to a system administrator for further analysis. In another embodiment, the mutation analysis module 412 flags the fingerprints stored in the analysis fingerprint database 413 to allow the system administrator to identify and perform further analysis on the sets of fingerprints stored in the analysis fingerprint database 413.

A signature module 414 creates signatures to detect malware. In one embodiment, the signature module 414 creates a signature to detect particular malware that the mutation analysis module 412 has determined has generic mutating code. The signature module 414 uses the mutation pattern determined by the mutation analysis module 412 to create the signature for the specific malware. The signature module 414, with the help of the server communication module 410, transmits the created signature to the endpoints 110. The signature transmitted to the endpoints 110 is used by the security modules 116 of the endpoints to detect the specific malware at its various stages of mutation.

Figure 5:
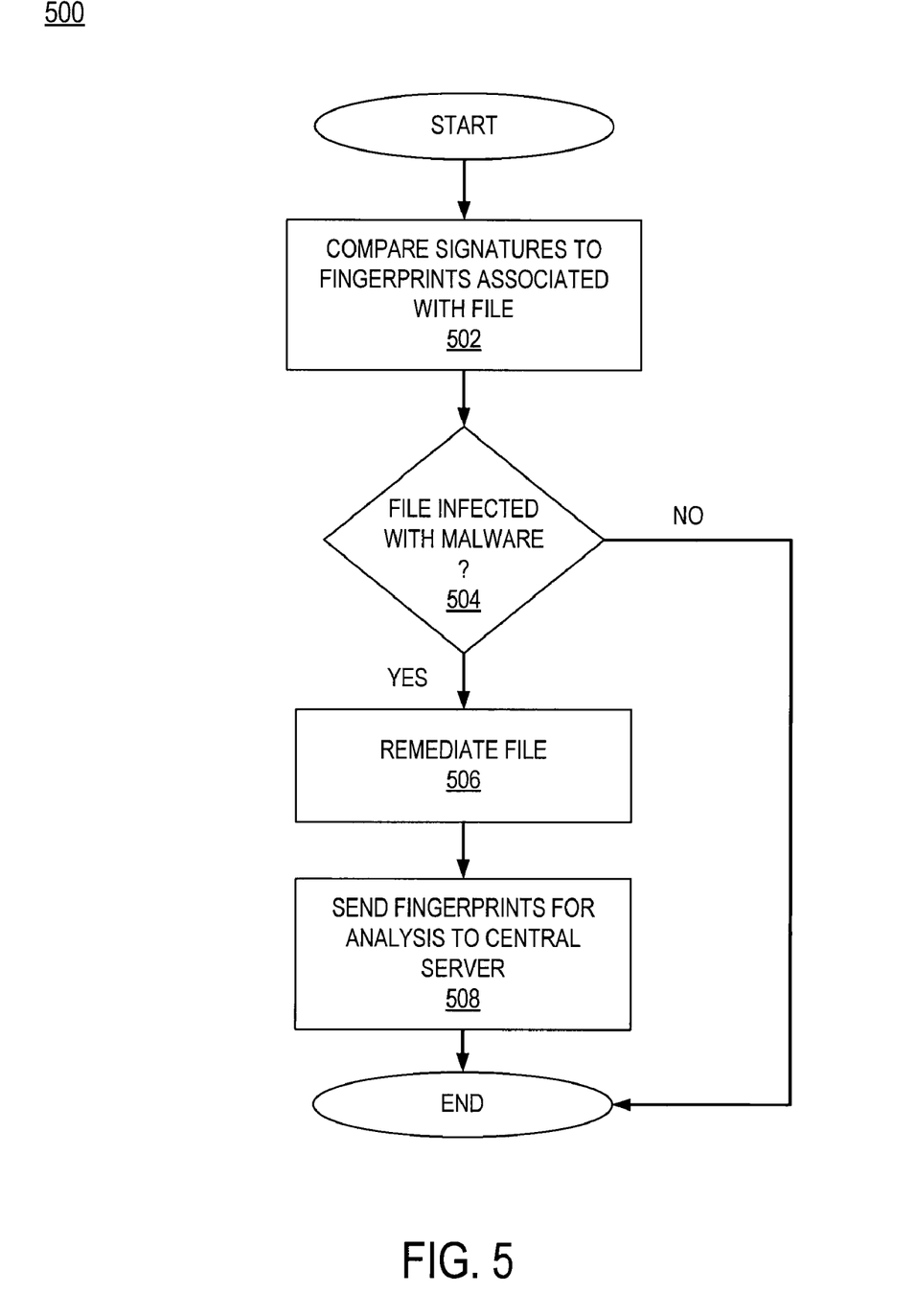
FIG. 5 is a flowchart illustrating steps performed by a security module to scan a file for malware according to one embodiment.

FIG. 5 is a flowchart 500 illustrating steps performed by the security module 116 to scan a file for malware according to one embodiment. Other embodiments perform the illustrated steps in different orders, and/or perform different or additional steps. Moreover, some or all of the steps can be performed by modules other than the security module 116.

The security module 116 compares 502 signatures to fingerprints created for the file. In one embodiment, the security module 116 compares the signatures to each fingerprint created for the file. In another embodiment, the security module 116 compares the signatures to the fingerprints of the file in two phases. In the first phase, the security module 116 compares the signatures to only the most recent fingerprint created for the file. If none of the signatures match the most recent fingerprint, the security module 116 executes the second phase. In the second phase, the security module 116 compares the signatures to each fingerprint created for the file, except for the fingerprint compared in the first phase.

Based on the comparison of the signatures to the fingerprints, the security module 116 determines 504 whether the file is infected with malware. If the security module 116 determines that the file is not infected with malware, the scanning of the file is complete. If it is determined the file is infected with malware, the security module 116 remediates 506 the file. In one embodiment, the security module 116 remediates the file by cleaning up and/or quarantining the file. The security module 116 sends 508 the fingerprints of the file to the central server 112 for analysis.

Figure 6:
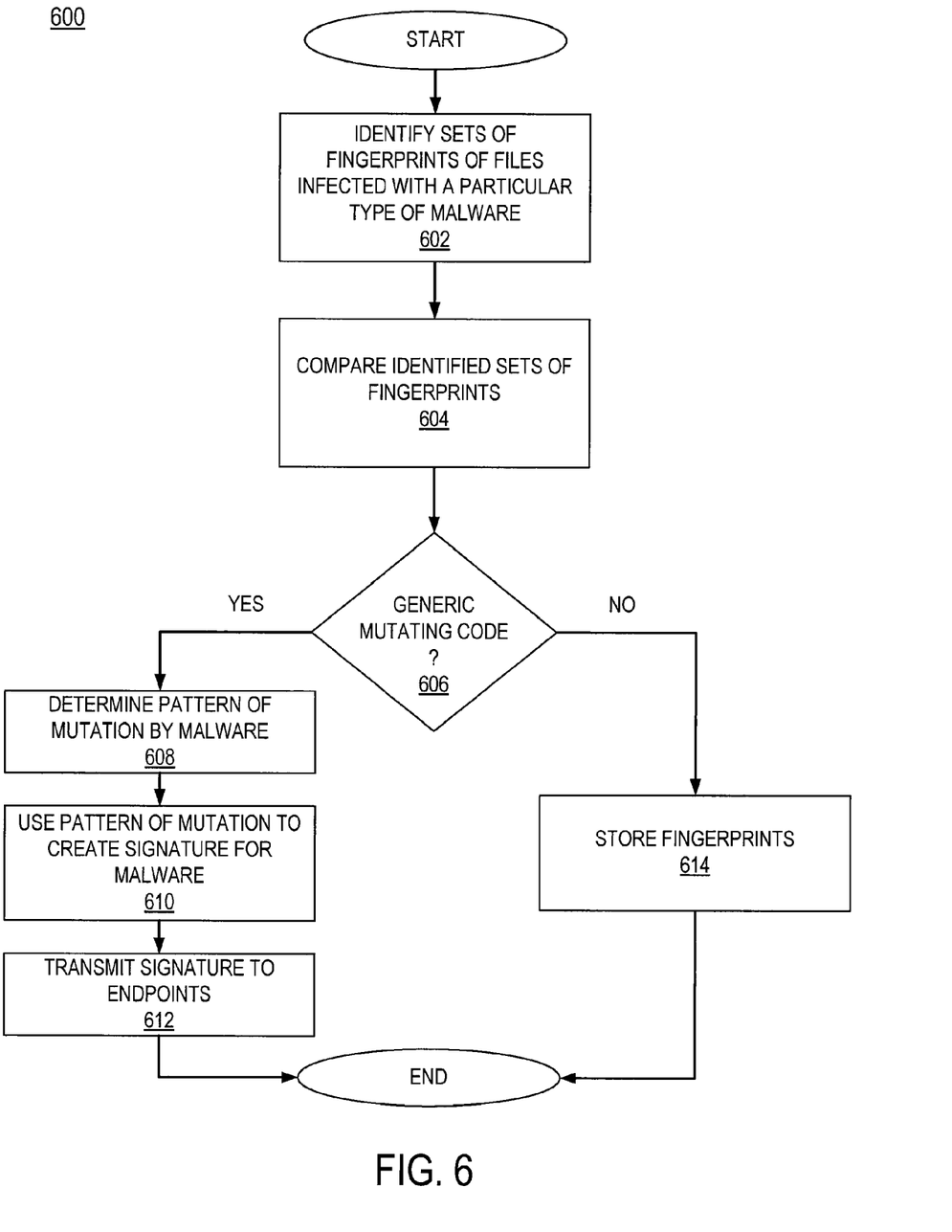
FIG. 6 is a flowchart illustrating steps performed by a central server according to one embodiment.

FIG. 6 is a flowchart 600 illustrating steps performed by a central server 112 according to one embodiment. Other embodiments perform the illustrated steps in different orders, and/or perform different or additional steps. Moreover, some or all of the steps can be performed by servers other than the central server 112.

The central server 112 identifies 602 sets of fingerprints received from multiple endpoints, each set of fingerprints of a file infected with a same particular type of malware. In one embodiment, the central server 112 identifies the sets of fingerprints after receiving from an endpoint fingerprints of a file infected with the particular type of malware. In another embodiment, the central server 112 identifies the sets of fingerprints periodically. The central server 112 compares 604 the identified sets of fingerprints. The central server 112 determines 606 whether the type of malware has generic mutating code by analyzing the fingerprints to determine whether the malware undergoes the same mutations on different endpoints.

If it is determined that the malware has generic mutating code, the central server 112 determines 608 the malware's pattern of mutation. The central server 112 determines the malware's pattern of mutation by analyzing one or more of the identified sets of fingerprints. The central server 112 uses the determined pattern of mutation to create 610 a signature that can detect the malware at its various stages of mutation. The central server 112 transmits 612 the signature to the endpoints 110. On the other hand, if it is determined that the type of malware does not have generic mutating code, the central server 112 stores 614 the fingerprints for subsequent use when fingerprints of files infected with the same type of malware are received. In one embodiment, the stored fingerprints are used by a system administrator for further analysis.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

The invention claimed is:

1. A method for detecting mutating malware in a file, the method comprising:
   creating, by a computer, a plurality of fingerprints for a file that has not been classified as infected with a mutating malware, each fingerprint created responsive to creation or modification of the file;
   comparing, by the computer, a malware signature associated with the mutating malware to a most recently created fingerprint from the plurality of fingerprints;
   responsive to the malware signature not matching the most recently created fingerprint, comparing, by the computer, the malware signature to one or more of the plurality of fingerprints created prior to the most recently created fingerprint; and
   responsive to the malware signature matching one of the plurality of fingerprints, classifying, by the computer, the file as infected with the mutating malware.

2. The method of claim 1, further comprising:
   responsive to a number of fingerprints created for the file being above a threshold, deleting an oldest fingerprint among the plurality of fingerprints.

3. The method of claim 2, wherein the threshold is determined based on a file type of the file.

4. The method of claim 1, further comprising remediating the file responsive to classifying the file as infected with the mutating malware.

5. The method of claim 1, further comprising:
   responsive to classifying the file as infected with the mutating malware, transmitting to a server multiple fingerprints of the plurality of fingerprints for analysis of the mutating malware.

6. The method of claim 5, wherein the multiple fingerprints transmitted to the server include the fingerprint matching the malware signature and fingerprints created subsequent to the fingerprint matching the malware signature.

7. A method for creating a signature to detect mutating malware, the method comprising:
   identifying, by a server computer, multiple sets of fingerprints of a plurality of files infected with a same mutating malware, wherein the sets of fingerprints are received from a plurality of endpoints storing the plurality of files and wherein each fingerprint of a file is created prior to determining that the file is infected with the mutating malware and responsive to creation or modification of the file;
   analyzing, by the server computer, the multiple sets of fingerprints to determine a pattern of mutation by the mutating malware;
   creating, by the server computer, a signature for detecting mutations of the mutating malware based at least in part on the determined pattern of mutation; and
   transmitting, by the server computer, the created signature to the plurality of endpoints for use in detecting the mutation malware.

8. The method of claim 7, wherein analyzing the multiple sets of fingerprints further comprises:
   responsive to not being able determine the pattern of mutation, flagging the multiple sets of fingerprints to allow a system administrator to identify and analyze the multiple sets of fingerprints.

9. A computer program product having a non-transitory computer-readable storage medium having computer-executable code for detecting mutating malware in a file, the computer-executable code comprising:
   a fingerprint module configured to create a plurality of fingerprints for a file that has not been classified as infected with a mutating malware, each fingerprint created responsive to creation or modification of the file; and
   a malware detection module configured to:
      compare a malware signature associated with the mutating malware to a most recently created fingerprint from the plurality of fingerprints;
      responsive to the malware signature not matching the most recently created fingerprint, compare the malware signature to one or more of the plurality of fingerprints created prior to the most recently created fingerprint; and
      classify the file as infected with the mutating malware, responsive to the malware signature matching one of the plurality of fingerprints.

10. The computer program product of claim 9, wherein the fingerprint module is further configured to:
    delete an oldest fingerprint among the plurality of fingerprints, responsive to a number of fingerprints created for the file being above a threshold.

11. The computer program product of claim 9, further comprising:
    a malware remediation module configured to remediate the file, responsive to the malware detection module classifying the file as infected with the mutating malware.

12. The computer program product of claim 9, further comprising:
    a malware remediation module configured to transmit to a server multiple fingerprints of the plurality of fingerprints for analysis of the mutating malware, responsive to the malware detection module classifying the file as infected with the mutating malware.

13. The computer program product of claim 12, wherein the multiple fingerprints transmitted to the server include the fingerprint matching the malware signature and fingerprints created subsequent to the fingerprint matching the malware signature.

* * * * *